United States Patent
Brauer et al.

(10) Patent No.: US 9,354,971 B2
(45) Date of Patent: May 31, 2016

(54) SYSTEMS AND METHODS FOR DATA STORAGE REMEDIATION

(71) Applicant: Facebook, Inc., Menlo Park, CA (US)

(72) Inventors: Jonathan Charles Brauer, Round Rock, TX (US); Mateusz Marek Niewczas, Menlo Park, CA (US); Eran Tal, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 106 days.

(21) Appl. No.: 14/260,109

(22) Filed: Apr. 23, 2014

(65) Prior Publication Data

US 2015/0309871 A1    Oct. 29, 2015

(51) Int. Cl.
| | |
|---|---|
| *G06F 11/00* | (2006.01) |
| *G06F 11/10* | (2006.01) |
| *G06F 11/07* | (2006.01) |
| *G06F 11/30* | (2006.01) |

(52) U.S. Cl.
CPC ........ *G06F 11/1076* (2013.01); *G06F 11/0793* (2013.01); *G06F 11/1084* (2013.01); *G06F 11/3034* (2013.01)

(58) Field of Classification Search
CPC ............ G06F 11/0793; G06F 11/1076; G06F 11/1084; G06F 11/1415; G06F 11/3034
See application file for complete search history.

(56) References Cited

U.S. PATENT DOCUMENTS

| | | | | | |
|---|---|---|---|---|---|
| 7,702,973 | B2 * | 4/2010 | Mead | ................ | G01R 33/1207 360/31 |
| 7,890,791 | B2 * | 2/2011 | Fukuyama | ............ | G06F 11/008 714/25 |
| 8,909,983 | B2 * | 12/2014 | Chen | ................... | G06F 11/0793 714/6.1 |
| 2002/0038436 | A1 * | 3/2002 | Suzuki | ............... | G06F 11/1084 714/6.12 |
| 2002/0049923 | A1 * | 4/2002 | Kanazawa | .......... | G06F 11/0727 714/5.1 |
| 2003/0093721 | A1 * | 5/2003 | King | .................... | G11B 25/043 714/42 |
| 2004/0153844 | A1 * | 8/2004 | Ghose | .................. | H04L 41/064 714/42 |
| 2006/0277445 | A1 * | 12/2006 | Kano | .................. | G06F 11/0727 714/42 |
| 2010/0262868 | A1 * | 10/2010 | Galbraith | ............ | G06F 11/1092 714/42 |
| 2012/0066447 | A1 * | 3/2012 | Colgrove | ................ | G06F 3/061 711/114 |
| 2013/0086416 | A1 * | 4/2013 | Kopylovitz | ......... | G06F 11/0727 714/6.11 |

* cited by examiner

*Primary Examiner* — Yolanda L Wilson
(74) *Attorney, Agent, or Firm* — Sheppard Mullin Richter & Hampton LLP

(57) ABSTRACT

Systems, methods, and non-transitory computer-readable media can receive an indication that a drive included in a set of drives has experienced an error. Acquiring first data associated with the drive can be attempted. The drive can be prompted to undergo a power-cycle. Acquiring second data associated with the drive can be attempted. At least one of the first data or the second data can be analyzed to determine that the drive is remediable. At least the drive included in the set of drives can be remediated, such as by being rebuilt or reconfigured.

20 Claims, 10 Drawing Sheets

SYSTEMS AND METHODS FOR DATA STORAGE REMEDIATION

FIELD OF THE INVENTION

The present technology relates to the field of data storage. More particularly, the present technology provides techniques for remediating data storage systems.

BACKGROUND

The use of computing devices is becoming increasingly commonplace. Often times, computing devices utilize data storage to perform various functions. In one example, a data storage technology can involve integrating a plurality of hard disk drive components into a single entity or logical unit. In this example, the data storage technology may include a Redundant Array of Inexpensive (or Independent) Disks (RAID). Utilizing RAID for data storage can be advantageous because RAID can allow for data redundancy as well as performance improvement.

Sometimes, however, RAID drives can experience errors or fail. In accordance with conventional approaches, an erroneous or failed RAID drive can be retired and a replacement drive can be implemented in place of the erroneous or failed RAID drive. However, replacing a RAID drive can require significant effort and resources (e.g., cost, time, manual labor). Accordingly, conventional approaches for utilizing data storage technologies such as RAID can be expensive, wasteful, inconvenient, and inefficient. These drawbacks can detract from the overall experience associated with utilizing data storage technologies such as RAID.

SUMMARY

Various embodiments of the present disclosure can include systems, methods, and non-transitory computer readable media configured to receive an indication that a drive included in a set of drives has experienced an error. There can be an attempt to acquire first data associated with the drive. The drive can be prompted to undergo a power-cycle. Acquiring second data associated with the drive can be attempted. At least one of the first data or the second data can be analyzed to determine that the drive is remediable. At least the drive included in the set of drives can be remediated, such as by being rebuilt or reconfigured.

In one embodiment, remediating at least the drive included in the set of drives can further comprise attempting to acquire third data associated with the drive. The third data can be analyzed to verify that the drive is operational. Moreover, one or more file systems associated with at least the drive included in the set of drives can be rebuilt or reconfigured.

In one embodiment, analyzing the at least one of the first data or the second data to determine that the drive is remediable can further comprise comparing the first data and the second data to determine one or more differences. In some instances, the one or more differences can be indicative that the drive has at least a threshold likelihood of being remediable.

In one embodiment, each of the first data and the second data can include Self-Monitoring, Analysis and Reporting Technology (SMART) data.

In one embodiment, the SMART data can include information associated with at least one of a grown defects list (GLIST), an error-correcting code (ECC) memory, or a quantity of uncorrectable errors.

In one embodiment, the set of drives can correspond to a Redundant Array of Independent Disks (RAID) system.

In one embodiment, at least a portion of historical data associated with the drive can be removed prior to the remediating (e.g., rebuilding, reconfiguring) at least the drive included in the set of drives.

In one embodiment, removing at least the portion of the historical data associated with the drive can correspond to at least one of clearing a cache associated with the drive, clearing configuration data associated with the drive, or removing metadata associated with the drive.

In one embodiment, the set of drives can be associated with a RAID 6 system.

In one embodiment, a scan can be performed on the drive to verify that the drive is remediable. In some cases, the scan can be performed prior to the remediating at least the drive included in the set of drives.

In one embodiment, the set of drives can be associated with a RAID 0 system.

In one embodiment, the scan can be associated with a bad block scan.

In one embodiment, the bad block scan can be associated with a destructive scan.

In one embodiment, analyzing the at least one of the first data or the second data to determine that the drive is remediable can further comprise determining an identifier associated with the drive. Further, information associated with the identifier can be acquired. Also, it can be determined that the drive had not previously experienced the error.

In one embodiment, at least one of the first data or the second data can be recorded over time. At least one of the first data or the second data can be analyzed to determine a first set of properties associated with a first category of drives. Another drive having the first set of properties can be categorized as being irremediable.

In one embodiment, at least one of the first data or the second data can be recorded over time. At least one of the first data or the second data can be analyzed to determine a second set of properties associated with a second category of drives. Moreover, another drive having the second set of properties can be categorized as being remediable.

In one embodiment, the error can be associated with at least one of a firmware fail, an Input/Output (IO) error, or a file system error.

In one embodiment, the indication can be received via at least one of a RAID controller, a system health checker, or a monitoring component associated with a social networking service.

Many other features and embodiments of the invention will be apparent from the accompanying drawings and from the following detailed description.

Figure 1:
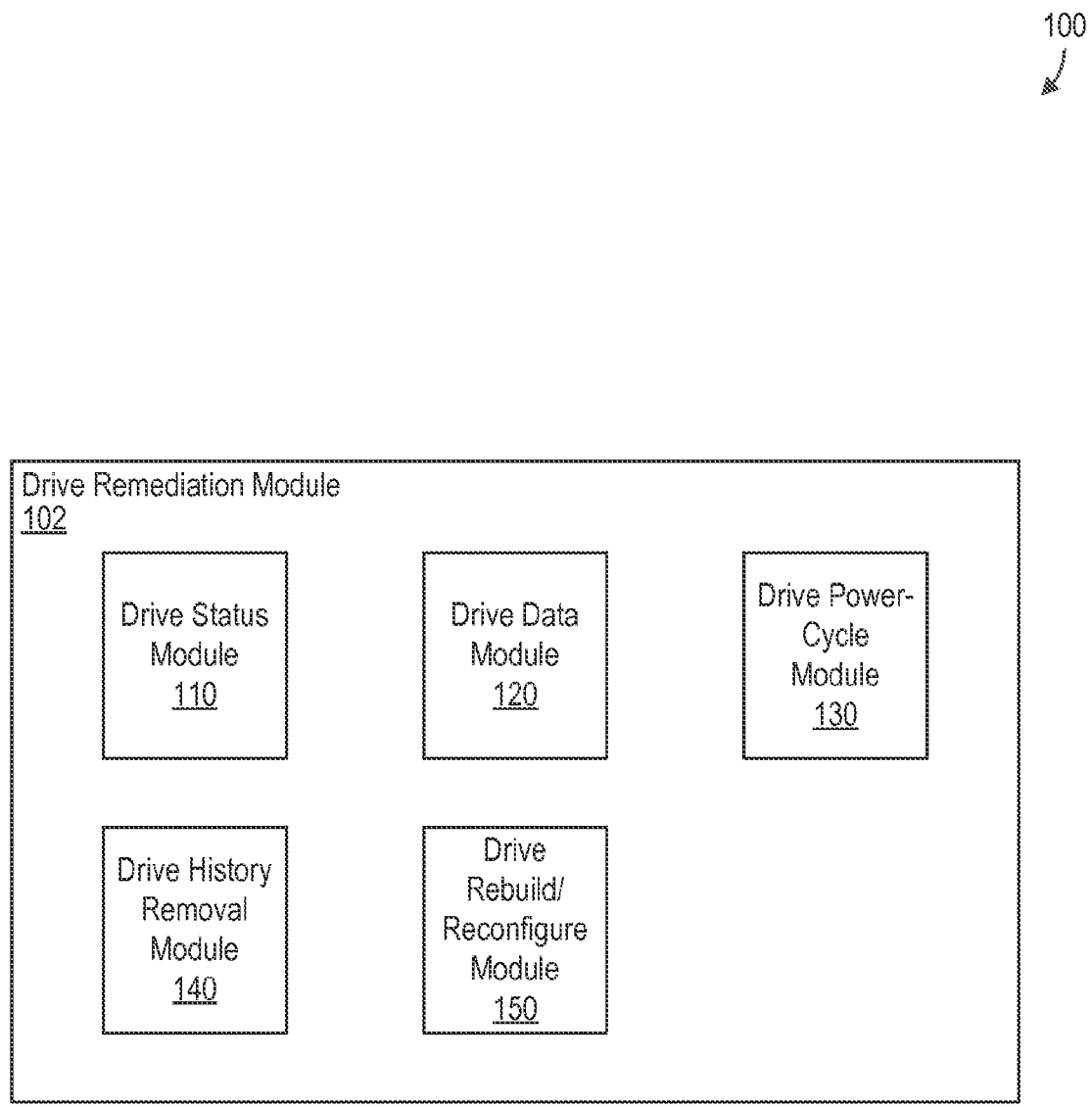
FIG. 1 illustrates an example system configured to facilitate remediation of data storage devices and/or systems, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Interactive Media Content Exchange

People often utilize computing devices (or computing systems) to store, access, manipulate, or otherwise interact with data. In one example, individual users of computing devices can store and manage data using a data storage system, such as a Redundant Array of Inexpensive (or Independent) Disks (RAID) system. Likewise, entities such as organizations, corporations, or service providers can utilize data storage systems, such as RAID systems, to store and manage their data. Accordingly, usage of data storage systems such as RAID systems has become commonplace.

A data storage system may contain many drives (e.g., hard disk drives). Sometimes, a particular drive included with a set of drives of a data storage system, can experience an error and/or failure. For example, a RAID drive within a RAID array (e.g., stack) can experience an error and/or failure. Under conventional approaches, the RAID drive can be retired and a replacement RAID drive can be installed into the RAID array. However, physically replacing the RAID drive under conventional approaches can be a time-consuming, costly, and labor-intensive task.

Various embodiments of the present disclosure can provide and/or facilitate remediation of data storage devices and/or systems. The disclosed technology can attempt to remediate a failed drive (e.g., a failed RAID drive), thereby reducing the likelihood that the failed drive has to be physically replaced. For example, a previously failed RAID drive that has been remediated based on the disclosed technology can function as expected within the RAID system/array, thereby saving valuable resources associated with having to physically replace the drive.

In some cases, various embodiments can be applicable to different types of data storage systems (and/or devices), such as RAID 0, RAID 1, RAID 2, RAID 3, RAID 4, RAID 5, RAID 6, and/or RAID 10, etc. In some cases, the disclosed technology can be applicable to hardware and/or software data storage systems (e.g., hardware RAID and/or software RAID). It is contemplated that there can be many other uses, applications, implementations, and/or variations associated with the various embodiments of the present disclosure.

FIG. 1 illustrates an example system 100 configured to facilitate remediation of data storage devices and/or systems, according to an embodiment of the present disclosure. The example system 100 can include a drive remediation module 102. The drive remediation module 102 can be configured to perform, manage, and/or facilitate various tasks or operations associated with remediating a data storage system (and/or device) such as a RAID system (e.g., a RAID array, a RAID stack). In some instances, the drive remediation module 102 can be implemented as hardware, software, or any combination thereof. In some cases, the drive remediation module 102 can be configured to work in conjunction with a controller of the data storage system (e.g., a RAID controller in the RAID system). In some embodiments, the drive remediation module 102 can be implemented within a social networking system (e.g., system 930 in FIG. 9). The depicted components in this figure and the other figures discussed herein are exemplary only, and may be variously replaced by, combined with, or integrated into other similar components.

As shown in the example of FIG. 1, the drive remediation module 102 can comprise a drive status module 110, a drive data module 120, a drive power-cycle module 130, a drive history removal module 140, and a drive rebuild/reconfigure module 150. The drive status module 110 can be configured to acquire (e.g., obtain, receive, retrieve, access, etc.) status information about one or more drives (e.g., disk drives), which can be included within the RAID system.

In one example, the drive status module 110 can be associated with a monitoring component, which can be configured to monitor the status(es) of at least one drive (e.g., at least one RAID drive). The drive status module 110 can be configured to acquire information about the drive via the monitoring component. If the drive undergoes an error and/or failure, the drive status module 110 can receive a notification or signal, such as via the monitoring component, indicating that the drive has experienced the error and/or has failed. The drive status module 110 can communicate the indication of the error or failure to other components of the drive remediation module 102.

The drive data module 120 can be configured to acquire, analyze, and/or otherwise process data associated with drives (e.g., RAID drives). Continuing with the previous example, the drive remediation module 102 can instruct the drive data module 120 to acquire data about the drive that experienced the error and/or failure. More details relating to the drive data module 120 are provided below with reference to FIG. 2.

As discussed above, the drive remediation module 102 can comprise the drive power-cycle module 130. The drive power-cycle module 130 can be configured to cause drives to undergo power-cycles (e.g., to restart, to turn off and then turn on, etc.). Continuing with the previous example, the drive power-cycle module 130 can instruct or command the drive that experienced the error and/or failure to undergo a power-cycle. In some cases, the power-cycle can fix or resolve the error and/or failure. If, for example, the drive is stuck in a failed state for any of various reasons, the power-cycle can bring the drive out of the failed state. As such, if the power-cycle can fix or resolve the error and/or failure, then the drive does not need to be replaced, thereby saving valuable resources (e.g., cost, time, manual labor, etc.).

The drive remediation module 102 can also comprise the drive history removal module 140. As discussed in the previous example, power-cycling the drive in some cases can fix or resolve the problem(s) (e.g., error, failure, etc.) encountered by the drive. However, even if the power-cycle does fix or resolve the problems, the drive itself and/or other components of the data storage system might still consider the drive to be failed. For example, a RAID controller might not recognize that a previously failed RAID drive has been power-cycled and fixed. In this regard, various types of historical information, such as configuration data, metadata, and/or other historical data associated with the drive, can still indicate that the drive experienced the error and/or failure. Accordingly, the drive history removal module 140 can be configured to remove undesired or otherwise obsolete historical data associated with the previously problematic drive, which is later remediated through a power-cycle. Removing the undesired historical data associated with the drive can allow the other components of the data storage system to recognize that the drive has been fixed or to consider the drive as never having experienced the error or failure in the first place.

The drive remediation module 102 can also comprise the drive rebuild/reconfigure module 150. In some cases, for example, the drive rebuild/reconfigure module 150 can be configured to rebuild the drive and/or data storage system, such as in the case with RAID 6 or other redundancy RAID drives. Continuing with the previous example, the drive rebuild/reconfigure module 150 can be configured to rebuild one or more file systems associated with the drive and/or with the data storage system. Upon successful completion of the rebuild of the drive, the drive can be considered remediated. In some cases, for example, the drive rebuild/reconfigure module 150 can be configured to reconfigure the drive and/or data storage system, such as in the case with RAID 0 or other similar drives. In this example, the drive rebuild/reconfigure module 150 can perform reconfiguration by setting the correct file system and adding the drive back into the RAID array, such that the operating system (OS) can recognize the drive. The drive can be considered remediated upon completion of the reconfiguration.

In some embodiments, the drive rebuild/reconfigure module 150 can be implemented as a single modules. In some embodiments, the drive rebuild/reconfigure module 150 can be implemented as two different modules, such as a drive rebuild module and a drive reconfigure module.

Figure 2:
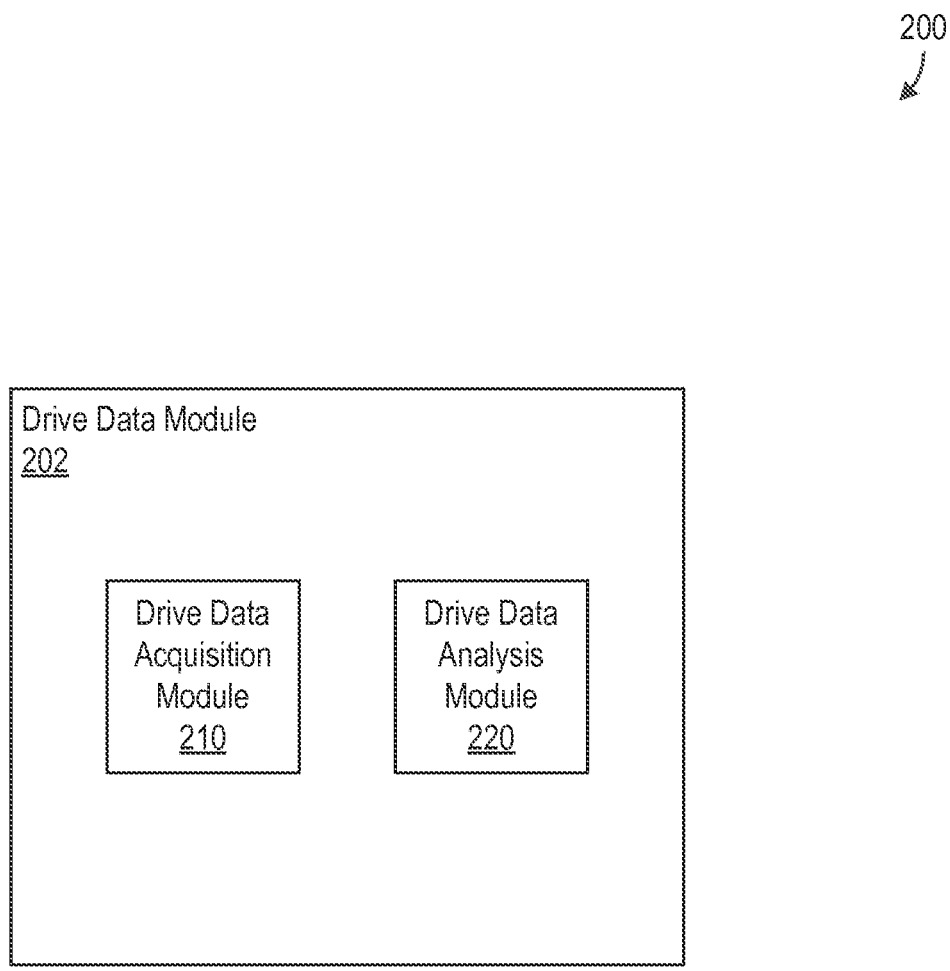
FIG. 2 illustrates an example system configured to facilitate remediation of data storage devices and/or systems, according to an embodiment of the present disclosure.

FIG. 2 illustrates an example system 200 configured to facilitate remediation of data storage devices and/or systems, according to an embodiment of the present disclosure. The example system 200 can include a drive data module 202, which can correspond to the drive data module 120 described with reference to FIG. 1. As discussed above, the drive data module 202 can be configured to acquire, analyze, and/or otherwise process data associated with one or more drives (e.g., RAID drives) of a data storage system (e.g., RAID system). As illustrated in the example of FIG. 2, the drive data module 202 can comprise a drive data acquisition module 210 and a drive data analysis module 220.

The drive data acquisition module 210 can be configured to acquire (e.g., obtain, retrieve, receive, access, etc.) data associated with a drive, such as a hard disk drive included within a RAID data storage system. In some embodiments, the data associated with the drive can include but is not limited to Self-Monitoring, Analysis and Reporting Technology (SMART or S.M.A.R.T.) data, metadata, historical data, etc. The SMART data can provide information about the drive, including, for example, one or more properties of the drive. In particular, the SMART data can include information associated with a grown defects list (GLIST), an error-correcting code (ECC) memory, how long the drive has been operational (e.g., read/write minutes, read/write hours, etc.), and/or a quantity of uncorrectable errors, etc.

In one example, a drive that has experienced an error or failure can be power-cycled in attempt to fix or resolve the error or failure, as discussed above. In some instances, the drive data acquisition module 210 can make an attempt to acquire data (e.g., SMART data, metadata, etc.) associated with the drive prior to the power-cycle. For example, such an attempt may be a first attempt to acquire data associated with the drive. In some cases, the drive data acquisition module 210 can make an attempt to acquire data associated with the drive after the power-cycle. For example, such an attempt may be a second attempt to acquire data associated with the drive. Moreover, the drive data module 202 can cause the drive data acquisition module 210 to acquire drive data whenever necessary.

As shown in FIG. 2, the drive data module 202 can also comprise a drive data analysis module 220. The drive data analysis module 220 can be configured to analyze data acquired from the drive (e.g., SMART data, metadata, etc.). Continuing with the previous example, if the drive data acquisition module 210 makes a successful first attempt to acquire data associated with the drive (e.g., prior to the power-cycle) and also makes a successful second attempt to acquire data associated with the drive (e.g., after the power-cycle), then the drive data analysis module 220 can analyze the data acquired in the first attempt and the data acquired in the second attempt. Analysis of the data may include, for example, comparing the data from the first attempt and the data from the second attempt. In some cases, differences, if any, in the data can indicate that the error and/or failure has been resolved. If, however, the first attempt was unsuccessful, then the drive data analysis module 220 can just analyze the data acquired from the drive in the second attempt. Furthermore, the drive data module 202 can cause the drive data analysis module 220 to analyze drive data whenever necessary.

Figure 3:
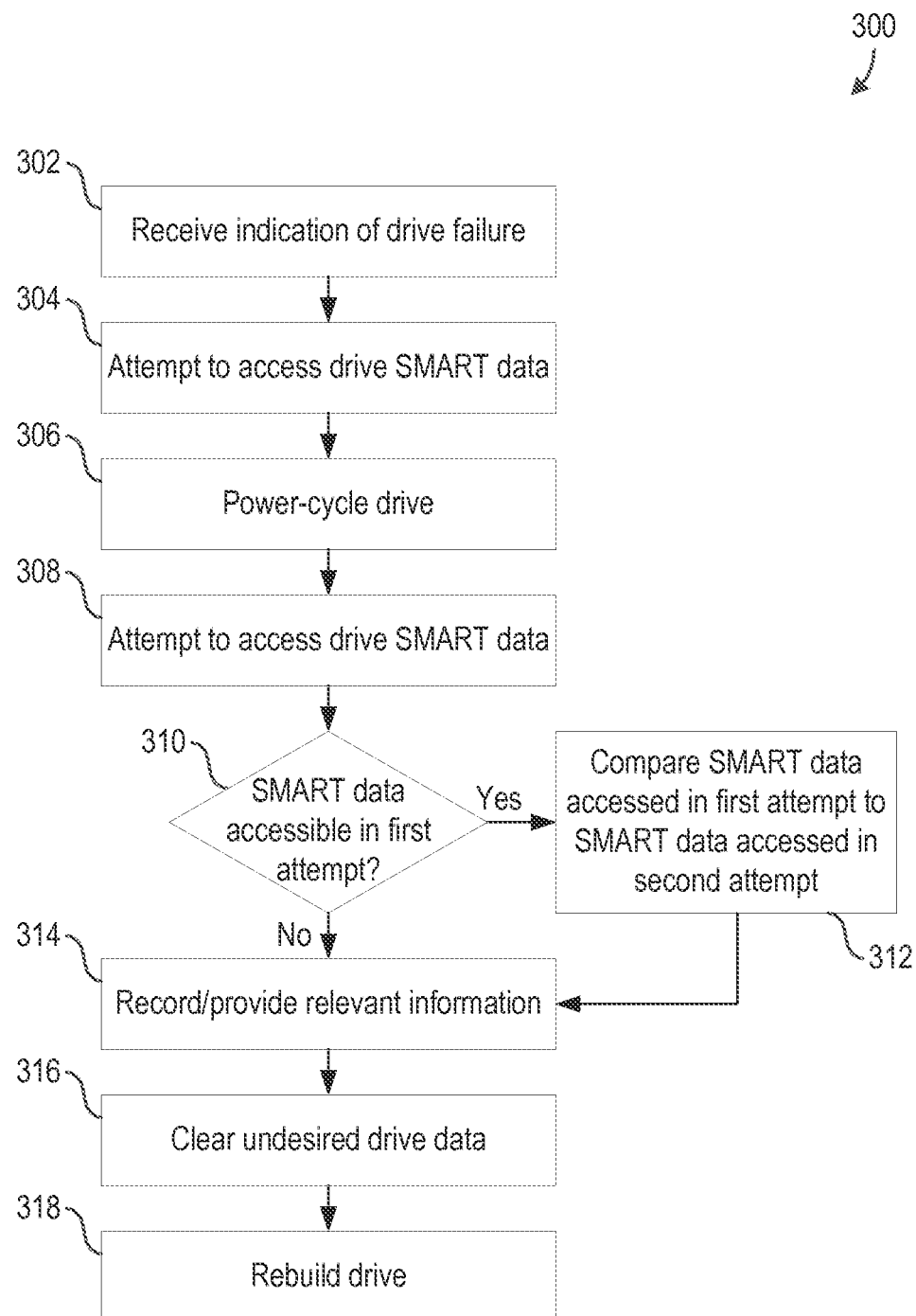
FIG. 3 illustrates an example method for providing remediation of data storage devices and/or systems, according to an embodiment of the present disclosure.

FIG. 3 illustrates an example method 300 for providing remediation of data storage systems and/or devices, according to an embodiment of the present disclosure. As previously discussed, various embodiments of the present disclosure can be applicable to various data storage systems and/or devices. For all of the methods discussed herein, it should be appreciated that there can be additional, fewer, or alternative steps performed in similar or alternative orders, or in parallel, within the scope of the various embodiments unless otherwise stated.

The method 300 in FIG. 3 illustrates an example flow that can be applicable for remediating a RAID 6 system (e.g., array, stack) or a RAID 6 drive within the RAID 6 system. At block 302, an indication of a drive failure (and/or a drive error) can be received. In some cases, the indication can be received or acquired based on status information about a drive, such as the RAID 6 drive within the RAID 6 system. In one example, a "Firmware Failed" state, identifier, signal, notification, and/or indication can be received for the RAID 6 drive.

In some embodiments, the data storage system may include a controller, such as a RAID controller for the RAID 6 system. The RAID controller can be configured to report status information about one or more drives within the RAID 6 system. In some implementations, there can be one or more monitoring components (e.g., health monitoring tools) communicatively coupled to the data storage system (e.g., RAID 6 system) and/or to the controller. The monitoring components can access various properties of the RAID 6 system and/or various properties of the drives within the RAID 6 system. For example, the monitoring components can be configured to receive reports from the controller to detect the "Firmware Failed" state of the RAID 6 drive, and/or to communicate with a drive remediation module, such as the drive remediation module 102 in FIG. 1.

In some implementations, the drive remediation module, the RAID controller, and the one or more monitoring components can be individual components. In some implementations, the drive remediation module, the RAID controller, and the one or more monitoring components can be combined into one or more components. In some instances, the drive remediation module, the RAID controller, the one or more monitoring components, and/or other components of the present disclosure can be implemented, at least in part, as hardware, software, or any combination thereof.

In some embodiments, the data storage system can correspond to a software RAID system. For the software RAID system, a system health checker component can be configured to periodically (e.g., every five minutes, every 15 minutes, every hour, etc.) run and monitor the status(es) of one or more drives within the software RAID system. The system health checker component can be configured to check certain parameters and to detect a failed (or error) state of a software RAID drive.

At block 304, there can be an attempt, such as a first attempt, to access (or acquire) SMART data associated with the RAID 6 drive having the "Firmware Failed" state. In some cases, since the RAID 6 drive has failed, the first attempt to access the SMART data may be unsuccessful. If, however, the first attempt is successful, then the SMART data can be accessed and/or recorded. The SMART data can, for example, indicate or provide information about a grown defects list (GLIST), how long the drive has been active, how many error correcting codes (ECGs) there have been, how many uncorrectable errors there have been, etc.

At block 306, the failed drive can be power-cycled. The power-cycling can occur whether or not the first data acquisition attempt was successful. In some embodiments, the drive can have a power-cycle feature built-in. In some cases, the drive remediation module 102 can cause the drive to undergo a power-cycle.

At block 308, there can be an attempt, such as a second attempt, to access (or acquire) the SMART data associated with the drive. Since the drive has been power-cycled, the second attempt to access the drive SMART data may be successful. As such, the SMART data acquired from the second attempt can be analyzed and/or evaluated. At block 310, it can be checked whether the first attempt was successful in acquiring SMART data. If result of block 310 is no, then the flow can proceed to block 314. If the result of block 310 is yes, the flow can proceed to block 312. At block 312, the SMART data accessed from the first attempt can be compared with the SMART data accessed from the second attempt. Differences, if any, between the SMART data acquired from the first attempt (prior to the power-cycle) and the SMART data acquired from the second attempt (after the power-cycle) can, in some cases, indicate that the power-cycle has fixed the drive. In some cases, differences between the SMART data acquired from the first attempt and the SMART data acquired from the second attempt can indicate that the drive is likely problematic.

At block 314, relevant information can optionally be recorded and/or provided. For example, in some implementations, the SMART data from the second attempt, the SMART data differences, if any, between the first attempt and the second attempt, one or more properties of the drive, metadata associated with the drive, and/or historical data associated with the drive, can be recorded. Further, information indicating that the drive has been power-cycled, for example, can be provided or communicated to the controller of the RAID 6 system.

At block 316, undesired drive data can be cleared or removed. In some instances, undesired historical data, metadata, and/or configuration data (e.g., foreign configuration data) associated with the drive can be removed. For example, metadata can be associated with the data storage system (e.g., the entire RAID 6 array) and the metadata can facilitate identifying the drive in the data storage system. For example, the metadata can facilitate distinguishing the drive from other drives in the data storage system. The metadata can indicate that the RAID 6 drive, in particular, previously failed and/or experienced the error. However, if the power-cycle has fixed the drive, then at least some of the metadata is no longer accurate and thus undesired, and can be removed or cleared because the drive has been fixed.

In one example, the RAID 6 drive can enter a bad state (e.g., in the drive's firmware state-machine) and can stop responding. If the historical data of the drive continues to indicate that the drive is in the bad state (e.g., the drive continues to be marked as being bad) even after the power-cycle has fixed the drive, then the drive is still not completely remediated because the system/array of which the drive is a part still considers the drive to be bad. Accordingly, the inaccurate, and thus undesirable, historical data and/or metadata can be removed to enable the drive and the system/array to recognize the drive as being good (or not bad).

At block 318, there can be an attempt to rebuild the drive. In some cases, rebuilding the drive can include rebuilding one or more file systems associated with the RAID 6 drive and/or the RAID 6 system. In some cases, rebuilding the drive can include making another attempt to access (or acquire) the SMART data associated with the drive in order to further check for errors. If, for example, errors are identified, then the drive can be appropriately handled, such as by being retired and being replaced by an installation of another drive into the system.

In some instances, accessing the SMART data can be useful for recording an identifier (e.g., serial number, unique identifier) of the drive. In some implementations, a record may indicate that the drive associated with the identifier has already failed once (e.g., prior to the power-cycle). As such, if the drive fails again (e.g., subsequent to being power-cycled), then the drive can be retired and replaced without attempting to further remediate it, thereby saving valuable resources.

Figure 4:
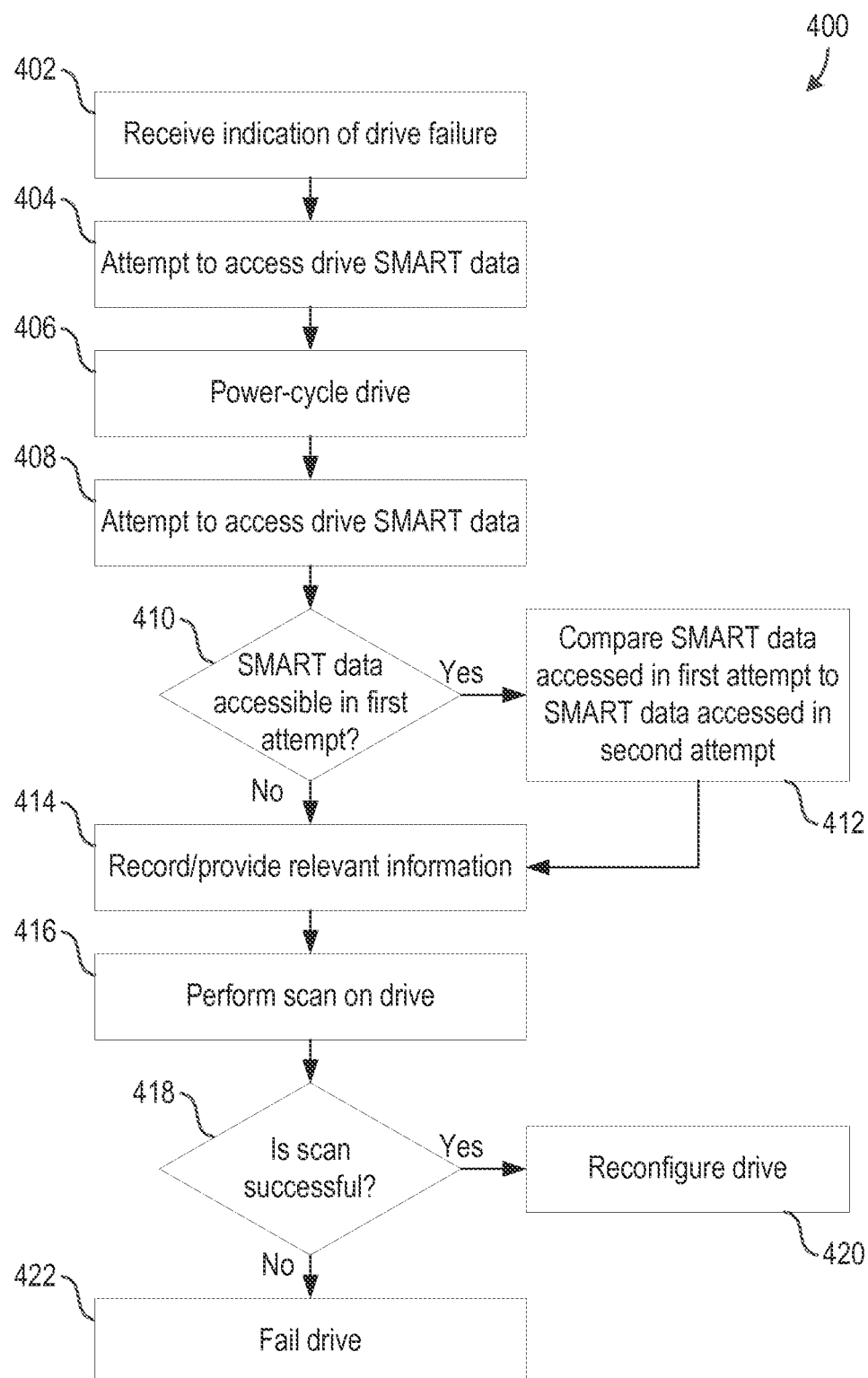
FIG. 4 illustrates an example method for providing remediation of data storage devices and/or systems, according to an embodiment of the present disclosure.

FIG. 4 illustrates an example method 400 for providing remediation of data storage systems and/or devices, according to an embodiment of the present disclosure. As discussed, various embodiments of the present disclosure can be applicable to various data storage systems and/or devices. The method 400 in FIG. 4 illustrates an example flow that can be applicable for remediating a RAID 0 data storage system. It is contemplated that many other variations, implementations, and/or applications are also possible.

At block 402, an indication of a drive failure (and/or error) can be received. For example, the indication of the drive failure can be received by a drive remediation module (e.g., drive remediation module 102 in FIG. 1) operable in conjunction with the RAID 0 system. In some cases, the drive failure (and/or error) can include but is not limited to an input-output (IO) error, a file system error (e.g., an XFS error), and/or other errors.

At block 404, there can be an attempt to access (or acquire) SMART data associated with the failed RAID 0 drive. This can be a first attempt to access the drive SMART data and may not necessarily be a successful attempt. If the first attempt is successful, then the accessed SMART data associated with the failed drive can be processed (e.g., analyzed, at least temporarily stored, etc.).

At block 406, the drive can then be power-cycled whether the first attempt to access the SMART data was successful or not. In some cases, the power-cycle can fix or resolve the error(s) and/or failure(s) experienced by the drive.

At block 408, there can be another attempt, such as a second attempt, to access (or acquire) the SMART data associated with the drive. The second attempt to access the SMART data can have a higher likelihood of being successful because the drive has undergone the power-cycle. The SMART data accessed in the second attempt can be processed (e.g., analyzed, stored, etc.). In some cases, if the second attempt to access the SMART data is unsuccessful, the drive can be considered problematic and can be retired and replaced.

At block 410, it can be checked whether the first attempt to access the drive SMART data was successful. If the result of block 410 is no, then various types of relevant information can be recorded and/or provided, at block 414. For example, the SMART data acquired from the second attempt can be recorded and information indicating that the drive has been power-cycled can be provided (e.g., communicated). If the result of block 410 is yes, then the SMART data from the first attempt can be compared to the SMART data from the second attempt, at block 412. Differences between the SMART data (if any) can be recorded and analyzed. For example, the differences between the SMART data can relate to growth in the GLIST, ECC errors, etc. Then relevant information can be recorded (e.g., stored) and/or provided (e.g., transmitted), at block 414.

At block 416, a scan can be performed with respect to the RAID 0 drive. In some embodiments, the scan can correspond to a full scan (e.g., full surface scan). In some implementations, the scan can correspond to a partial scan (e.g., scanning the problematic/erroneous/failed portion(s) of the drive). For example, if the scan corresponds to a partial scan, then one or more particular logical block addresses (LBAs) associated with the drive or one or more particular ranges of data addresses associated with the drive can be scanned. In some cases, the scan can be destructive (e.g., data on the drive is erased). In one example, the scan can correspond to a bad block scan. The bad block scan can involve, for example, writing one or more data patterns to the drive, reading the written data patterns, and verifying that the data patterns are accurate.

At block 418, it can be determined whether the scan was successful. If the result of block 418, is yes (e.g., no errors were detected or encountered), then the drive can be reconfigured, at block 420. In some implementations, reconfiguring the drive can include but is not limited to recreating a file system on the drive, clearing a cache on a RAID 0 controller, and/or removing undesired historical data associated with the drive. In some cases, the disclosed technology can enable the drive reconfiguring process to occur in the background without interfering with server operations or otherwise impact operations supported by the data storage system.

If the result of block 418 is no (e.g., the scan was not successful), then the drive can be considered failed and irremediable, at block 422, and further remediation efforts can be terminated. The drive can, for example, be retired and a replacement drive can be installed.

In some embodiments, data other than the SMART data can be utilized for remediation. In some implementations, techniques other than the bad block scan can be used for remediation. In some cases, vendor specific features and/or functionality of the drive can be utilized for remediation in conjunction with various embodiments of the present disclosure. For example, drive vendors can develop features (e.g., proprietary tools) that analyze drives and attempt to provide more in-depth error analysis.

Figure 5:
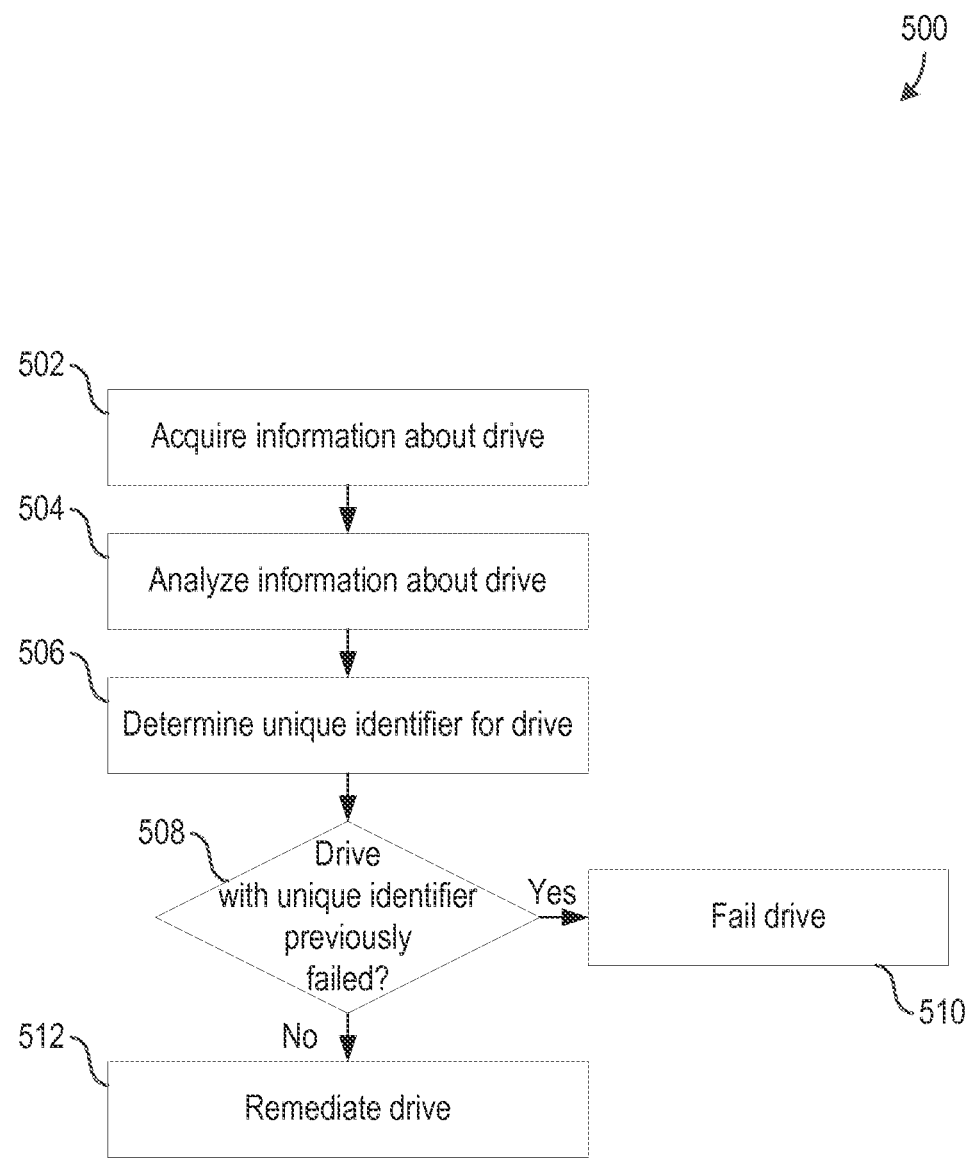
FIG. 5 illustrates an example method associated with remediation of data storage devices and/or systems, according to an embodiment of the present disclosure.

FIG. 5 illustrates an example method 500 associated with remediation of data storage devices and/or systems, according to an embodiment of the present disclosure. At block 502, information about a failed drive can be acquired. The information can be acquired, for example, during an attempt to access SMART data associated with the failed drive. In some instances, the information can include but is not limited to the SMART data, metadata associated with the drive, one or more properties of the drive, and/or historical data associated with the data, etc.

At block 504, the information about the drive can be analyzed. At block 506, a unique identifier can be determined for the drive. For example, the SMART data can be analyzed to determine a serial number of the drive. At block 508, a database or data store can be checked to determine whether the drive with the unique identifier had previously failed. If the result of block 508 is yes, then the drive can be failed at block 510, and no further remediation occurs for the drive. If the result of block 508 is no, the drive with the unique identifier did not previously fail, and the drive can be remediated at block 512.

In one example, if the information about the drive was acquired in a first attempt to access SMART data of the drive (e.g., block 304 in FIG. 3, block 404 in FIG. 4, etc.) and it was determined that the drive had failed before, then the drive can be failed, considered irremediable, and no further remediation (e.g., power-cycling, rebuilding, reconfiguring, etc.) needs to take place for the drive.

Figure 6:
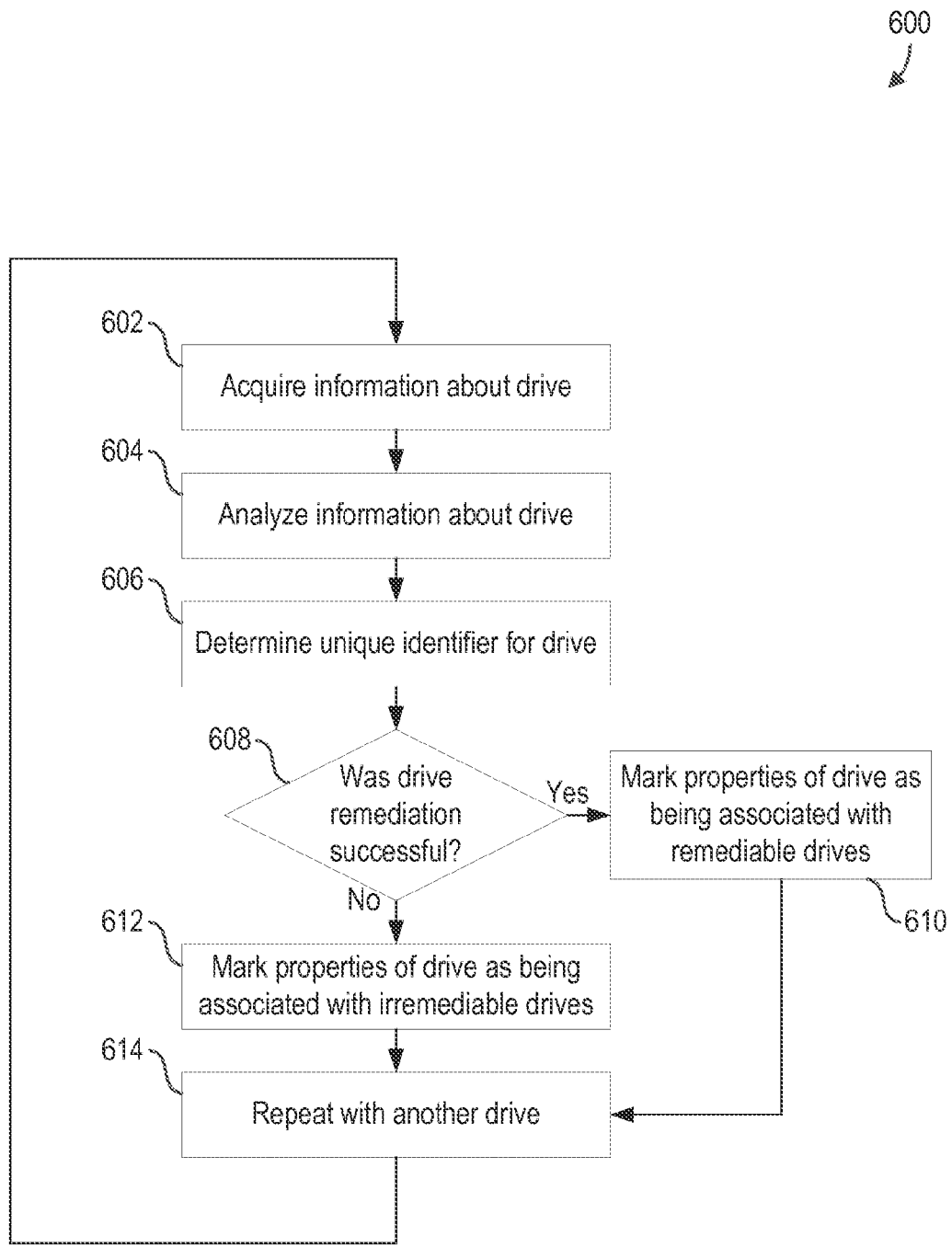
FIG. 6 illustrates an example method associated with remediation of data storage devices and/or systems, according to an embodiment of the present disclosure.

FIG. 6 illustrates an example method 600 associated with remediation of data storage devices and/or systems, according to an embodiment of the present disclosure. At block 602, information (e.g., SMART data, metadata, etc.) about a failed (and/or erroneous) drive can be acquired. At block 604, the information can be analyzed. At block 606, a unique identifier (e.g., serial number) for the drive can be determined. At block 608, it can be determined whether the drive was successfully remediated. If the result of block 608 is yes, then one or more properties (or other information) related to the drive can be deemed (e.g., marked, labeled, categorized, etc.) to be associated with remediable drives at block 610. For example, the type of error/failure, the manufacturer, and/or the model of the drive can be considered or categorized as being associated with drives that are remediable or have higher likelihoods of being remediable. If the result of block 608 is no, then the one or more properties (or other information) related to the drive can be deemed to be associated with irremediable drives at block 612. For example, the type of error/failure, the manufacturer, and/or the model of the drive can be considered or categorized as being associated with drives that are not remediable or have lower likelihoods of being remediable. In some embodiments, this process can repeat with another drive(s), as shown in block 614.

Accordingly, in some embodiments, failure/error detection can be improved over time (e.g., based on historical data, categorizations, etc.). For example, a data remediation module (e.g., module 102 in FIG. 1) can determine over time that certain failed drives (e.g., failed drives that behave in a certain matter, failed drives that have certain properties in common, etc.) have higher likelihoods of being remediable and may satisfy a threshold likelihood of being remediable, while others have lower likelihoods of being remediable and may not satisfy a threshold likelihood of being remediable. Such determinations can be performed manually or through machine learning techniques. For example, data can be integrated or aggregated into an operational data store (ODS), and alarms or notifications can be created. In some cases, the data remediation module can determine that drives associated with particular makes/manufacturers, models, and/or vendors can be more likely or less likely to be remediable. In some cases, diagnostics can be tuned and improved over time.

Furthermore, in some implementations, various diagnostics, such as drive built-in procedures, sense data, and/or sense keys can be utilized. It is contemplated that other data, diagnostics, tools, processes, etc. can be utilized for various aspects of the present disclosure, such as for determining whether or not a drive has experienced an error and/or failure.

Figure 7:
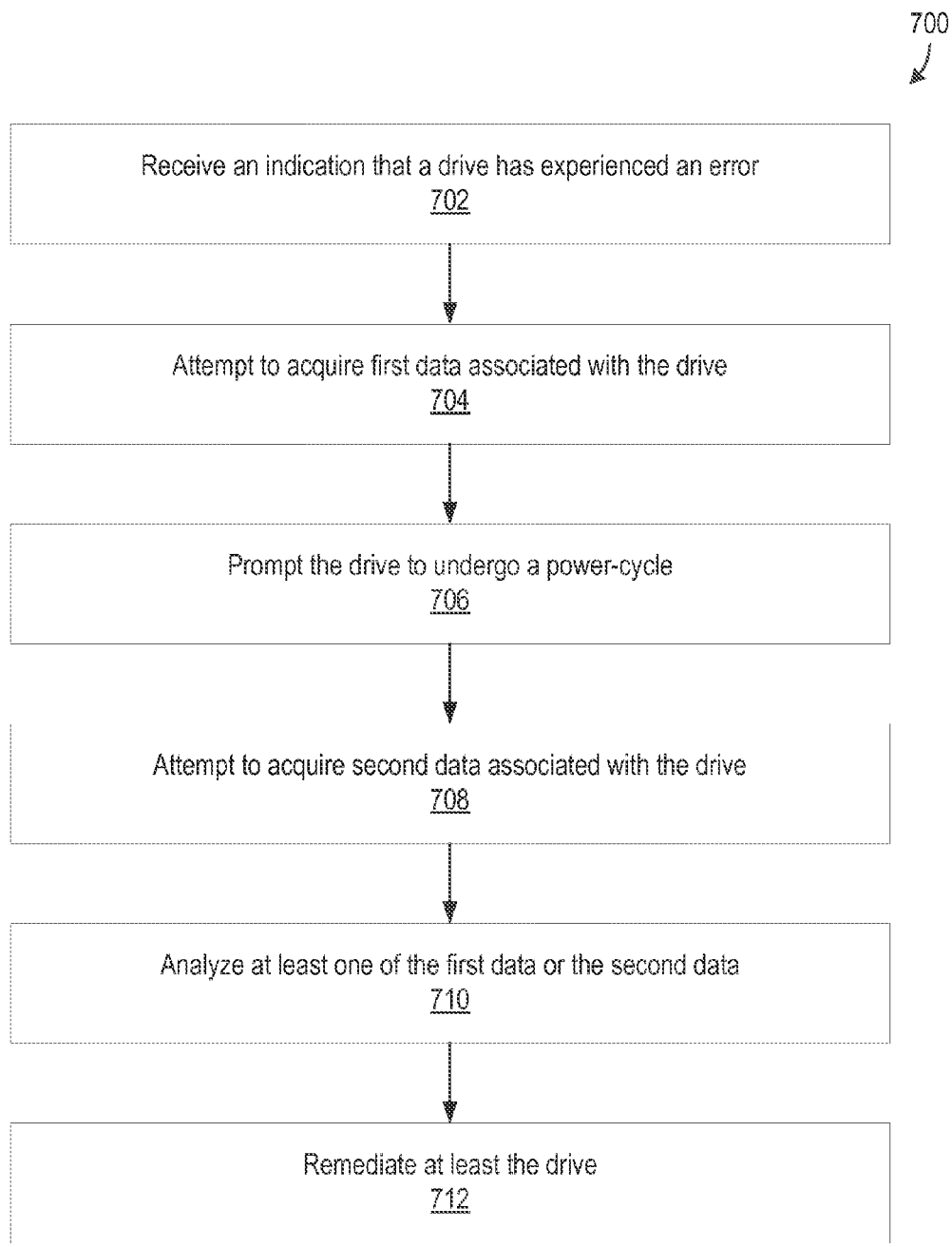
FIG. 7 illustrates an example method for providing remediation of data storage devices and/or systems, according to an embodiment of the present disclosure.

FIG. 7 illustrates an example method 700 for providing remediation of data storage devices and/or systems, according to an embodiment of the present disclosure. At step 702, an indication that a drive included in a set of drives has experienced an error (or failure) can be received. In some cases, the error (or failure) can be related to the drive's firmware, input/output (IO), and/or file system. At step 704, acquisition of first data associated with the drive can be attempted. In some cases, the first data can include but is not limited to SMART data, metadata, and/or historical data, etc. At step 706, the drive can be prompted to undergo a power-cycle. In some instances, the power-cycle can fix or resolve the error (or failure) experienced by the drive. At step 708, acquisition of second data associated with the drive can be attempted. Similar to the first data, the second data can, in some cases, include SMART data, metadata, and/or historical data. At step 710, at least one of the first data or the second data can be analyzed to determine that the drive is remediable. In some instances, an unsuccessful attempt to acquire the second data can indicate that the drive is irremediable. At step 712, at least the drive included in the set of drives can be remediated, such as by being rebuilt or reconfigured. In some embodiments, various other components included in the set of drives can be remediated (e.g., rebuilt, reconfigured).

Figure 8:
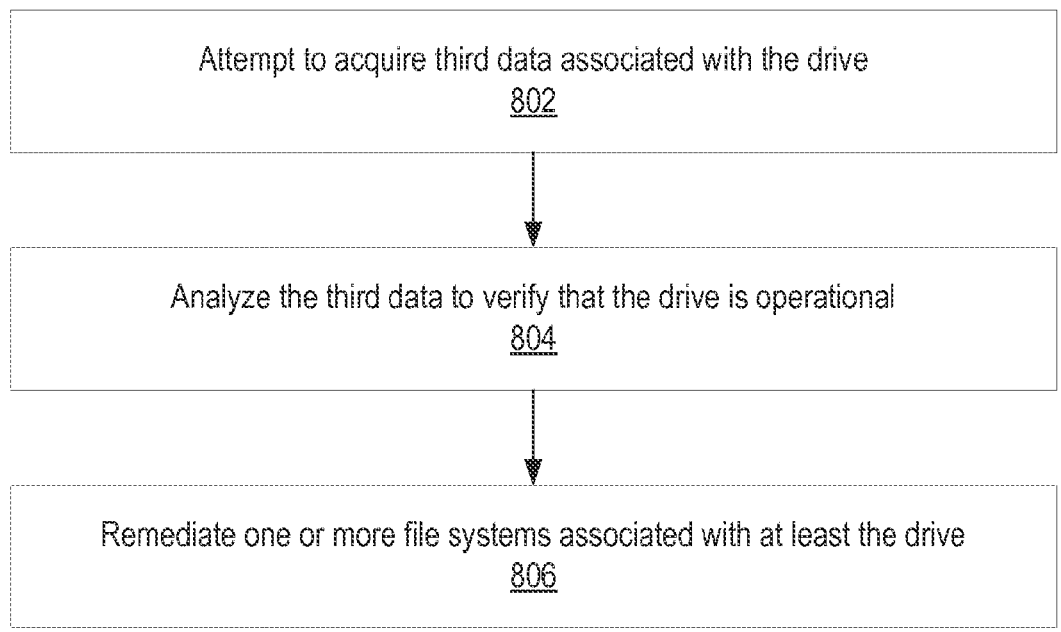
FIG. 8 illustrates an example method for providing remediation of data storage devices and/or systems, according to an embodiment of the present disclosure.

FIG. 8 illustrates an example method 800 for providing remediation of data storage devices and/or systems, according to an embodiment of the present disclosure. In FIG. 8, a drive having experienced an error or failure can undergo a power-cycle. At step 802, acquisition of third data associated with the drive can be attempted. In some instances, the third data can include but is not limited to SMART data, metadata, and/or historical data, etc. At step 804, the third data can be analyzed to verify that the drive is operational. For example, the third data can be analyzed to verify that no errors subsequent to the power-cycle are present. At step 806, one or more file systems associated with at least the drive included in the set of drives can be remediated, such as by being rebuilt or reconfigured.

It is further contemplated that there can be many other uses, applications, implementations, and/or variations associated with the various embodiments of the present disclosure.

Social Networking System—Example Implementation

Figure 9:
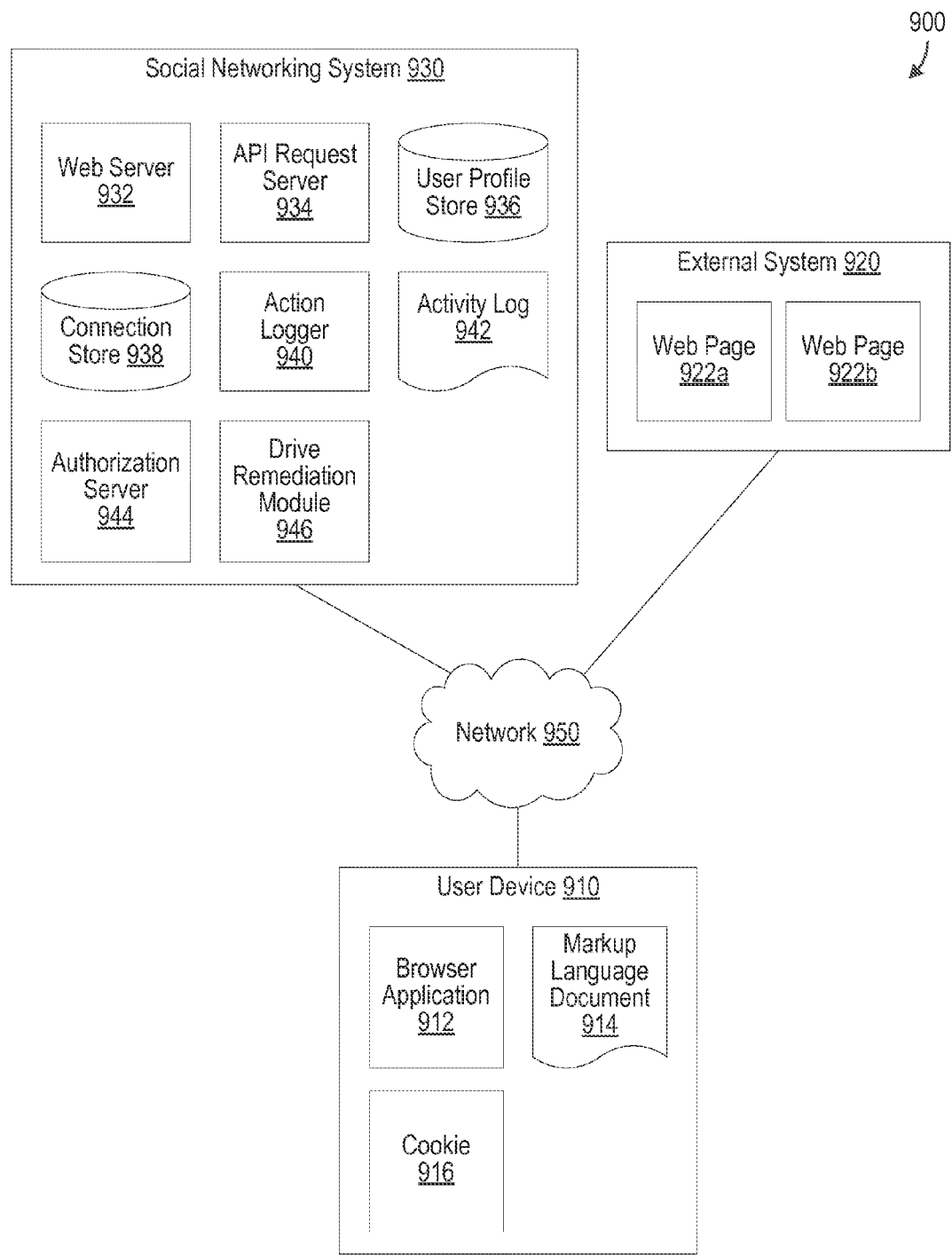
FIG. 9 illustrates a network diagram of an example system that can be utilized in various environments and/or scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

The social networking system 930 can include a drive remediation module 946. In some embodiments, the drive remediation module 946 can be implemented as the drive remediation module 102 of FIG. 1. As discussed above, the module 946 can be implemented as hardware, software, or any combination thereof. The drive remediation module 946 can be configured to facilitate remediation of data storage devices and/or systems, which can be utilized, for example, directly or indirectly by one or more computing devices (e.g., user device 910, computer system 1000 in FIG. 10). In one example, the drive remediation module 946 can receive an indication that a RAID drive within a RAID system or array has experienced an error or failure. The indication can be received via one or more monitoring components (e.g., health monitoring tools) of the social networking system 930. The drive remediation module 946 can attempt to acquire first data associated with the RAID drive. The module 946 can cause the drive to undergo a power-cycle. The module 946 can attempt to acquire second data associated with the drive. At least one of the first data or the second data can be analyzed by the module 946 to determine that the drive is remediable. Continuing with this example, the module 946 can remediate at least the drive included in the set of drives.

Hardware Implementation

Figure 10:
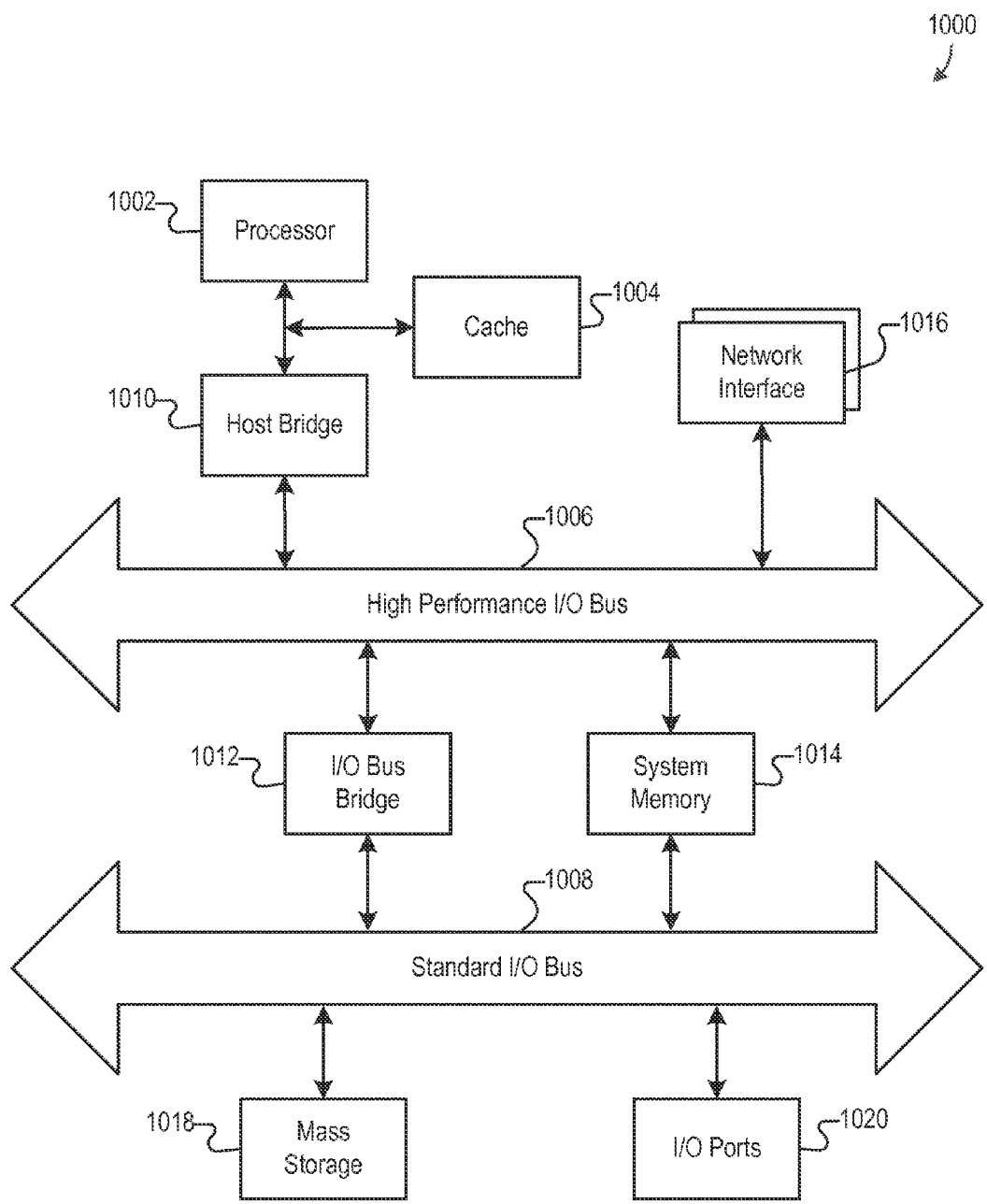
FIG. 10 illustrates an example of a computer system that can be utilized in various environments and/or scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
   receiving, by a computing system, an indication that a drive included in a set of drives has experienced an error;
   attempting, by the computing system, to acquire first data associated with the drive;
   prompting, by the computing system, the drive to undergo a power-cycle;
   attempting, by the computing system, to acquire second data associated with the drive, wherein attempting to acquire the second data occurs subsequent to the power-cycle, and wherein attempting to acquire the first data occurs prior to the power-cycle;
   analyzing, by the computing system, at least one of the first data or the second data to determine that the drive is remediable; and
   remediating, by the computing system, at least the drive included in the set of drives.

2. The computer-implemented method of claim 1, wherein the remediating at least the drive included in the set of drives further comprises:
   attempting to acquire third data associated with the drive;
   analyzing the third data to verify that the drive is operational; and
   performing at least one of a rebuild or a reconfiguration with respect to one or more file systems associated with at least the drive included in the set of drives.

3. The computer-implemented method of claim 1, wherein the analyzing the at least one of the first data or the second data to determine that the drive is remediable further comprises comparing the first data and the second data to determine one or more differences, the one or more differences being indicative that the drive has at least a threshold likelihood of being remediable.

4. The computer-implemented method of claim 1, wherein each of the first data and the second data includes Self-Monitoring, Analysis and Reporting Technology (SMART) data.

5. The computer-implemented method of claim 4, wherein the SMART data includes information associated with at least one of a grown defects list (GLIST), an error-correcting code (ECC) memory, or a quantity of uncorrectable errors.

6. The computer-implemented method of claim 1, wherein the set of drives corresponds to a Redundant Array of Independent Disks (RAID) system.

7. The computer-implemented method of claim 1, further comprising:
   removing at least a portion of historical data associated with the drive prior to the remediating at least the drive included in the set of drives.

8. The computer-implemented method of claim 7, wherein the removing at least the portion of the historical data associated with the drive comprises at least one of clearing a cache associated with the drive, clearing configuration data associated with the drive, or removing metadata associated with the drive.

9. The computer-implemented method of claim 8, wherein the set of drives is associated with a RAID 6 system.

10. The computer-implemented method of claim 1, further comprising:
    performing a scan on the drive to verify that the drive is remediable, wherein the scan is performed prior to the remediating at least the drive included in the set of drives.

11. The computer-implemented method of claim 10, wherein the set of drives is associated with a RAID 0 system.

12. The computer-implemented method of claim 10, wherein the scan is associated with a bad block scan.

13. The computer-implemented method of claim 12, wherein the bad block scan is associated with a destructive scan.

14. The computer-implemented method of claim 1, wherein the analyzing the at least one of the first data or the second data to determine that the drive is remediable further comprises:
    determining an identifier associated with the drive;
    acquiring information associated with the identifier; and
    determining that the drive had not previously experienced the error.

15. The computer-implemented method of claim 1, further comprising:

recording, over time, at least one of the first data or the second data;

analyzing the at least one of the first data or the second data to determine a first set of properties associated with a first category of drives; and categorizing another drive having the first set of properties as being irremediable.

16. The computer-implemented method of claim 1, further comprising:

recording, over time, at least one of the first data or the second data;

analyzing the at least one of the first data or the second data to determine a second set of properties associated with a second category of drives; and categorizing another drive having the second set of properties as being remediable.

17. The computer-implemented method of claim 1, wherein the error is associated with at least one of a firmware fail, an Input/Output (IO) error, or a file system error.

18. The computer-implemented method of claim 1, wherein the indication is received via at least one of a RAID controller, a system health checker, or a monitoring component associated with a social networking service.

19. A system comprising:

at least one processor; and a memory storing instructions that, when executed by the at least one processor, cause the system to perform:

receiving an indication that a drive included in a set of drives has experienced an error;

attempting to acquire first data associated with the drive;

prompting the drive to undergo a power-cycle;

attempting to acquire second data associated with the drive, wherein attempting to acquire the second data occurs subsequent to the power-cycle, and wherein attempting to acquire the first data occurs prior to the power-cycle;

analyzing at least one of the first data or the second data to determine that the drive is remediable; and remediating at least the drive included in the set of drives.

20. A non-transitory computer-readable storage medium including instructions that, when executed by at least one processor of a computing system, cause the computing system to perform:

receiving an indication that a drive included in a set of drives has experienced an error;

attempting to acquire first data associated with the drive;

prompting the drive to undergo a power-cycle;

attempting to acquire second data associated with the drive, wherein attempting to acquire the second data occurs subsequent to the power-cycle, and wherein attempting to acquire the first data occurs prior to the power-cycle;

analyzing at least one of the first data or the second data to determine that the drive is remediable; and remediating at least the drive included in the set of drives.

* * * * *